March 28, 1950 K. B. STUART 2,501,700
ACTIVATED CARBON MANUFACTURE
Filed Sept. 3, 1943 3 Sheets-Sheet 1
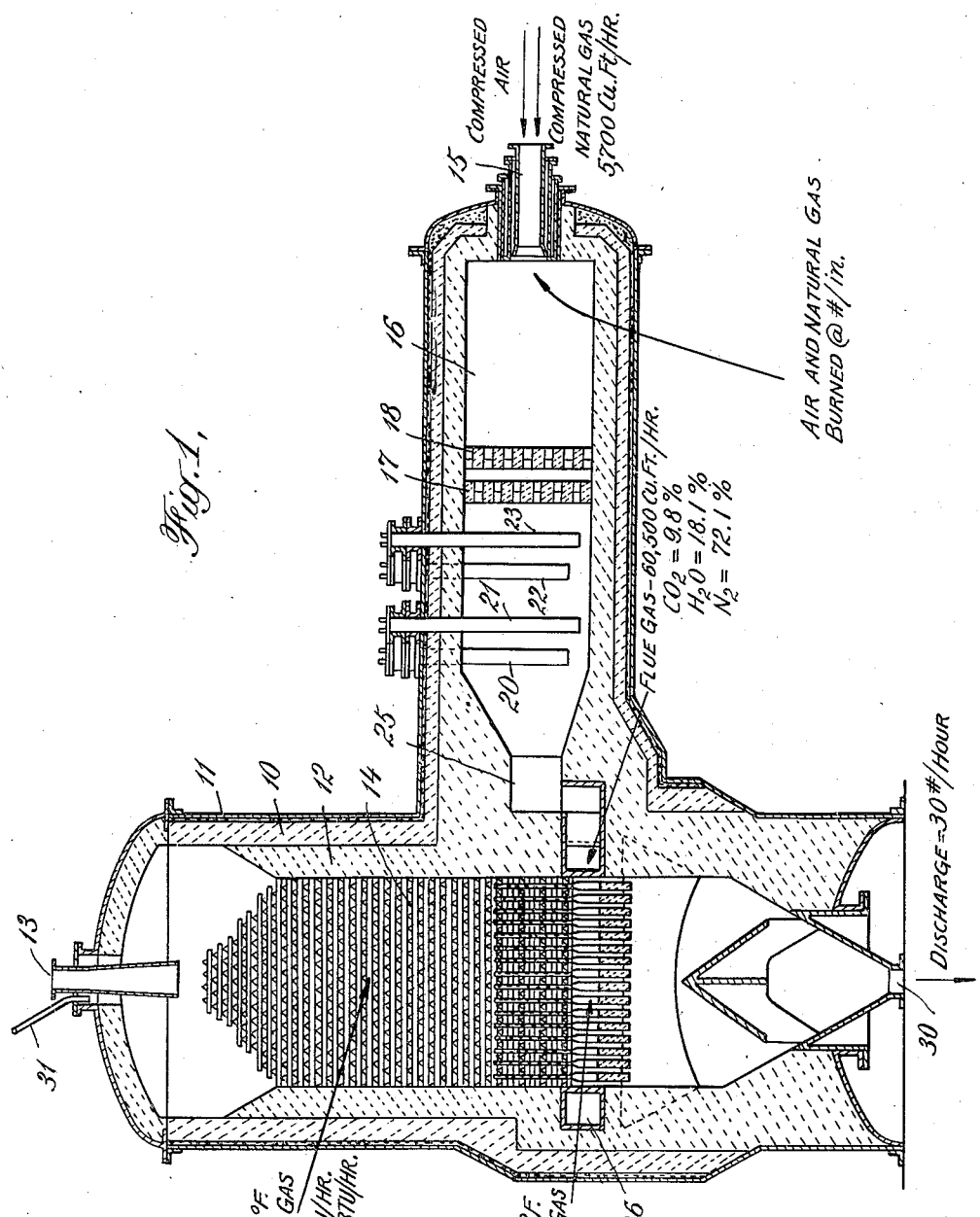
INVENTOR.
KENNETH BARTON STUART
BY
Pennie, Davis, Marvin & Edmonds
ATTORNEYS.

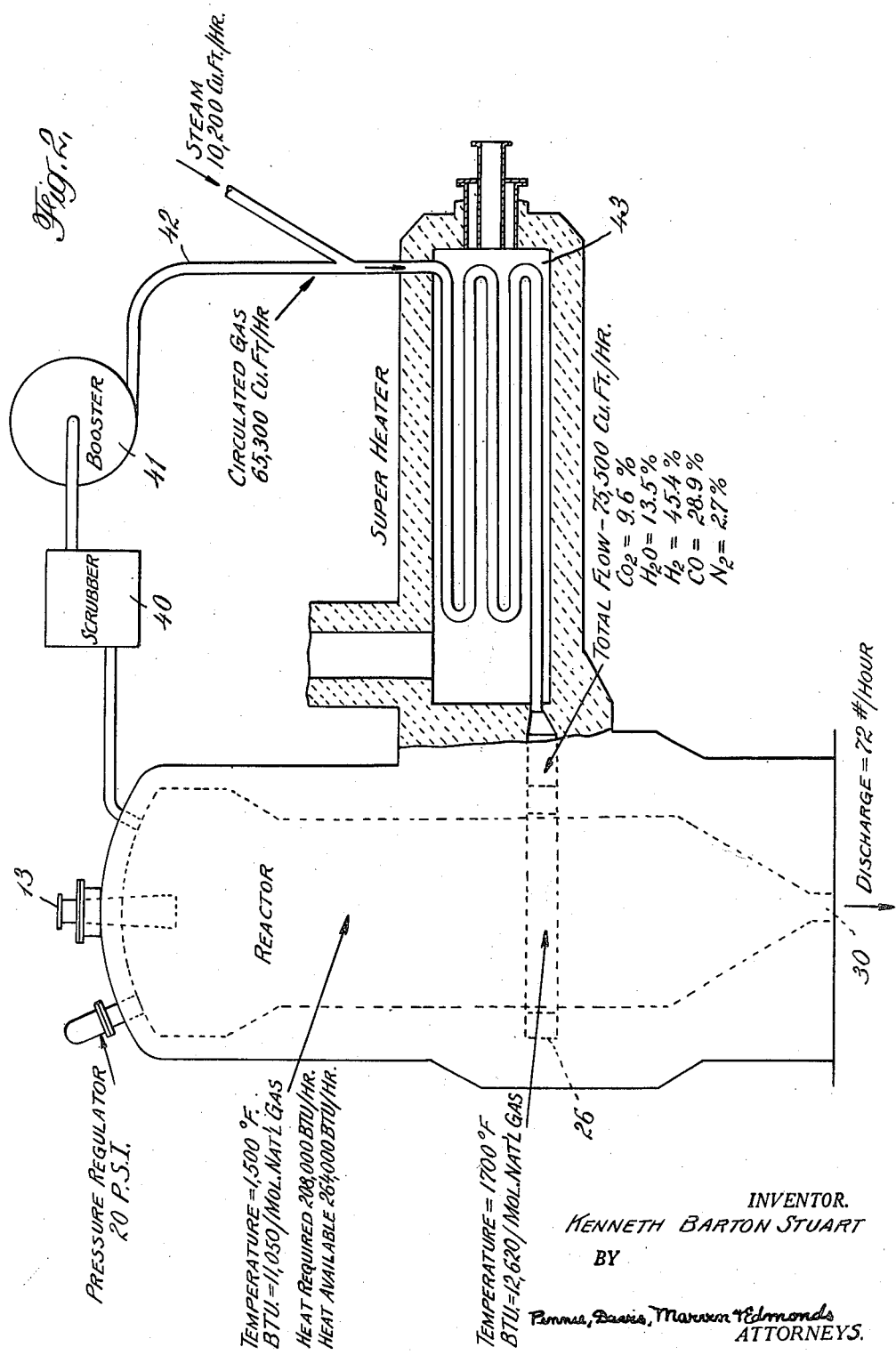

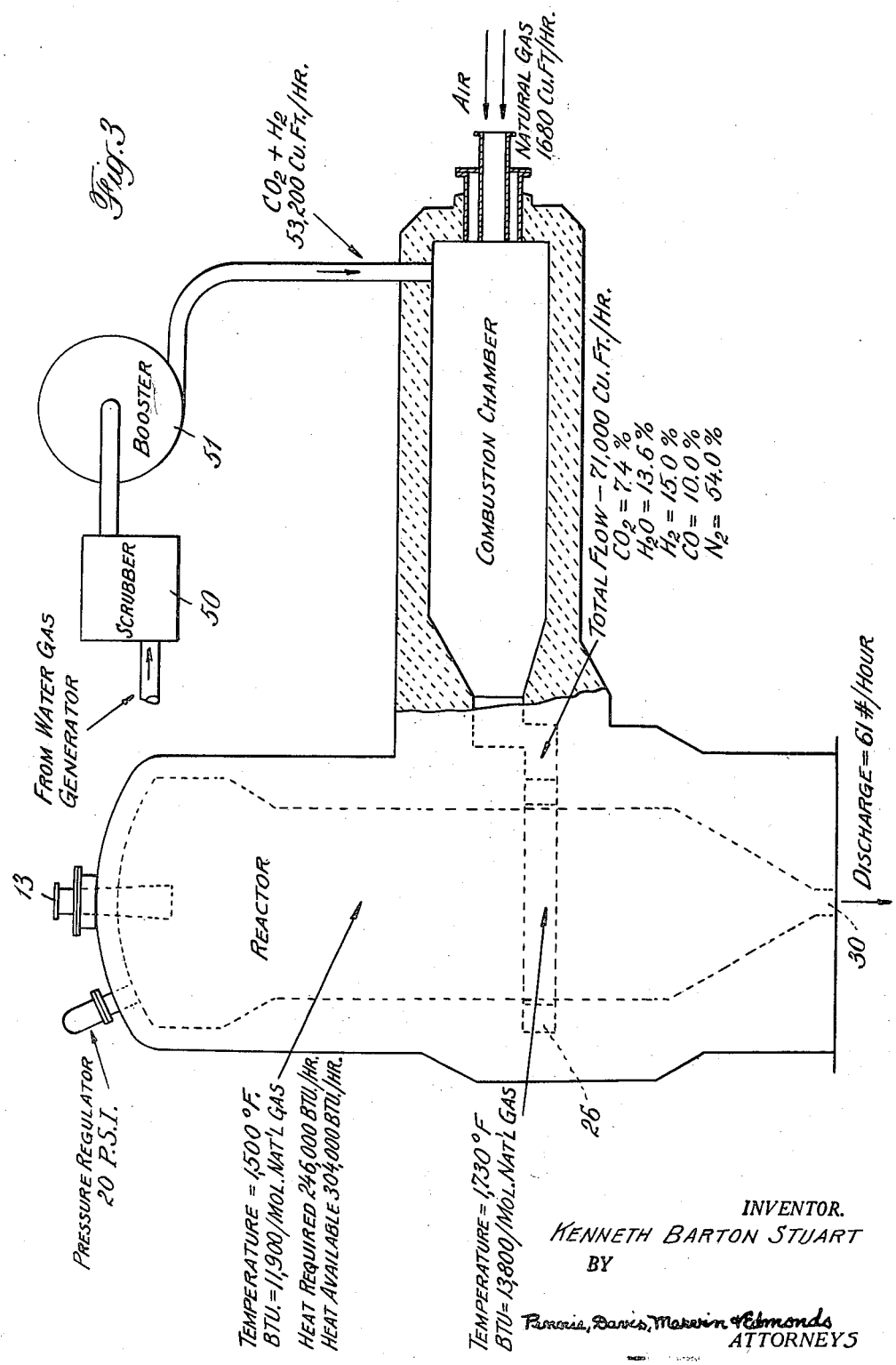

Patented Mar. 28, 1950

2,501,700

UNITED STATES PATENT OFFICE 2,501,700

ACTIVATED CARBON MANUFACTURE

Kenneth Barton Stuart, Denver, Colo., assignor to The Colorado Fuel and Iron Corporation, a corporation of Colorado Application September 3, 1943, Serial No. 501,044

4 Claims. (Cl. 252—445)

This invention is concerned with activated carbon. It provides improvements in the manufacture of activated carbon to the end that good active carbon can be produced from raw materials heretofore regarded as unsuitable and better activated carbon made from heretofore customary raw materials. The process of the invention is rapid and economical and may be practiced in simple and rugged equipment of high capacity.

The production of high grade activated carbon, for example that required for gas masks, heretofore, has been expensive and time consuming. The material has been treated in thin layers, say not to exceed three quarters of an inch in thickness, with consequent reduction in capacity of apparatus and complication in its design. Time for activation has been a matter of days instead of hours and at least a portion of the heat for activation has been supplied by conduction through a wall, with consequent difficulties in maintaining uniform temperatures throughout the mass undergoing treatment. Activation has been conducted at sub-atmospheric pressures and preferably under a substantial partial vacuum. Moreover, the process has required very careful sizing of the material subjected to carbonizing and activation and, even with careful sizing, a uniformly active product has been obtained only after grading and reactivation.

As described in my copending application, Serial No. 437,763, filed April 6, 1942, which has become abandoned, of which this is a continuation-in-part, it is possible to avoid many of the aforementioned difficulties and to obtain rapid production from a given source material of a more active carbon by activating a carbonaceous char by passing the activating gas in contact therewith at a temperature ranging from about 1400° F. to about 1600° F. while maintaining the char at a pressure substantially in excess of atmospheric.

As the result of further investigations, I have found that the activating operation becomes much more flexible and gives improved results if the volume of gas passed in contact with the char during activation is so large that substantially all of the thermal requirements of the activation reaction (the endothermic oxidation of carbon) are supplied by the sensible heat of this gas, the zone of contact between the char and the activating gas being maintained at a pressure substantially above atmospheric and a large proportion of the gas (preferably at least half) passed in contact with the char being inert with respect thereto, i. e. either inert per se or gaseous equilibria components as distinguished from reactants, such as $CO_2$ and $H_2O$, which combine endothermically with the carbon in the activating step.

The two gases most commonly employed in the activation of a carbonaceous char are steam and carbon dioxide. Steam reacts with some of the carbon of the char to produce carbon monoxide and hydrogen, whereas $CO_2$ reacts with carbon of the char to produce CO, both reactions being endothermic.

I have found that the presence of a substantial proportion of the reaction products (CO and $H_2$) in a gaseous mixture employed for activation in accordance with my invention is beneficial, that is to say at least part of the diluent gas accompanying the reactant gas (say $H_2O$ or $CO_2$) advantageously is carbon monoxide or hydrogen, or both.

As indicated above, the activation must be conducted at superatmospheric pressure, i. e. at pressures at least 5 pounds per square inch greater than atmospheric, and the entire sensible heat for activation must be supplied by the gas that is passed through the char during activation. For example, the heat requirement for the reaction $C+H_2O=CO+H_2=55,000$ B. t. u. at 1600° F. The sensible heat per mol of natural gas fired, assuming this to be the source of the activating gas is as follows:

|  | B. t. u. |
|---|---|
| At the gas temperature 1800° F | 144,000 |
| At the charge temperature 1600° F | 126,000 |
| Sensible heat available for reaction | 18,000 |

The natural gas required per mol of carbon oxidized=

$$\frac{55,000}{18,000}$$

or 3.07 mol. This is equivalent to 115 cubic feet of gas at 60° F. and 12.4 pounds per sq. in. pressure (atmospheric conditions at Pueblo, Colorado) per pound of carbon oxidized.

The natural gas is not used per se as the activating agent, but is burned under pressure in air to produce a mixture containing approximately 28% by volume of the reactants $CO_2$ and $H_2O$, the balance being nitrogen. This mixture may be supplied to the retort under pressure to bring about the activation.

It is desirable to dilute the products of combustion of the natural gas with the gaseous products of the activation reaction (CO and $H_2$), thereby forming a better activating mixture, although the same result may be obtained by supplying water gas from a separate generator and mixing it with the products of combustion of the natural gas in air.

These and other features of my invention will be more thoroughly understood in the light of the following detailed description, taken in conjunction with the accompanying drawings, in which:

Fig. 1 is a sectional elevation through an activating retort adapted to the practice of my invention and provided with a chamber in which air and natural gas are burned under pressure to provide the activating mixture.

Fig. 2 illustrates a modification of the apparatus of Fig. 1 in which the gaseous products of the activation are withdrawn from the retort, scrubbed, compressed, mixed with steam under pressure and then super-heated to produce the activating mixture.

Fig. 3 illustrates a further modification of the apparatus of Fig. 1 in which the product of the pressure combustion of air and natural gas is supplemented by water gas supplied from a producer.

Referring to the drawings, and particularly to Fig. 1, it will be observed that the apparatus comprises an upright retort 10 with a metal shell 11 lined with refractory heat insulating material 12. The char to be activated is introduced in relatively finely divided state into the top of the retort through an inlet 13 and trickles down through a refractory checker-work 14 within the retort. The refractory checker-work distributes the char uniformly throughout the retort section and thereby facilitates uniform treatment of the char with the activating gas.

The activating gas is obtained by burning air and natural gas under pressure in a burner 15 which projects into a combustion chamber 16 connected with the retort. The combustion chamber is provided with checker-work 17, 18 to aid in the combustion and beyond the checker-work there is a series of tubes 20, 21, 22, 23 which can be employed to heat or cool the activating gas formed by the combustion of the natural gas and the air under pressure. The air and the natural gas are burned at as high a pressure as feasible. It has been found that there is no difficulty in burning natural gas in air at a pressure of 20 lbs. per square inch gauge, or say 35 lbs. per square inch absolute.

The activating gas is forced through a passage 25 into a manifold 26 that distributes it throughout the retort.

In the retort the activating gas removes absorbed substances from the char and also consumes some of the carbon in activating reactions, thereby increasing the porosity of the carbon and rendering it active.

The activated char may be withdrawn continuously from the retort through a discharge 30.

The gaseous products of the endothermic activated reaction, principally hydrogen and carbon monoxide diluted with nitrogen, are discharged continuously from the upper portion of the retort, for example through the outlet 31.

Operating data for a retort treating Colorado anthracite are given on Fig. 1. It will be observed that the gas employed for activation and formed by burning air and natural gas under pressure contains about 10% $CO_2$ and 18% water vapor, the balance being nitrogen. This gas enters the retort at a temperature of 1680° F. and a continuous flow of the gas through the char results in the maintenance of a temperature of 1500° F. in the body of the char being activated.

Referring now to Fig. 2, it will be observed that the apparatus is the same as that employed in Fig. 1 with the exception of the means employed for producing the activating gas. In the operation illustrated in Fig. 2, the gaseous products of activation, CO and $H_2$ diluted with $N_2$, are withdrawn, scrubbed in a scrubber 40, and pumped through a booster 41 which increases the pressure into a main 42. Steam is mixed with the combustion products in the main and the mixture is superheated in a coil type superheater 43. The superheated activating gas mixture is then passed into the retort as described herein with respect to Fig. 1.

The apparatus illustrated in Fig. 3 is similar to that of Figs. 1 and 2 except for the means empoyed for producing the activating gas. Thus the apparatus of Fig. 3 differs from that of Fig. 1 in the addition of means for adding water gas to the products of combustion of the air and natural gas. Water gas (producer gas) from a generator (not shown) are passed through a scrubber 50 and thence through a booster 51. The booster increases the pressure of the water gas, which in composition is not greatly different from the gas resulting from the activating reaction in the retort and consists mainly of CO, $H_2$ and $N_2$. The water gas is forced into the combusion chamber of the apparatus and there it is mixed with the product of combustion of the air and natural gas, the mixture being introduced into the retort as described in the case of Fig. 1.

Thermal data for the operations illustrated by Figs. 2 and 3 are given on the respective figures.

Although the reactants preferably should constitute less than half of the activating mixture, the optimum reactant concentration is somewhat dependent on operating conditions. Relatively high concentrations of reactants may be employed satisfactorily at low temperatures with narrow carbon columns. Lower concentration should be used at higher temperatures and with wider carbon columns. In either case operations at efficiencies well below the thermal equivalent of the particular apparatus generally results in good distribution of the reactants and of the heat supplied.

The benefits to be derived through the practice of the invention are illustrated in the accompanying tables. Table No. 1 gives the results of four operations conducted employing activating gases at atmospheric pressure.

Table No. 2 consists of three series. Series No. 2 gives three sets of results obtained employing as an activating gas under pressure the mixture resulting from the pressure combustion of natural gas in air. Series No. 1 corresponds to the operation illustrated in Fig. 2 and in which the gaseous products of the activating reaction (carbon monoxide and hydrogen) are recycled and mixed with steam to form an activating gas mixture. Series No. 3 gives results obtained in an operation such as that illustrated in Fig. 3 in which the products of combustion of natural gas in air under pressure are diluted with carbon monoxide and hydrogen, the gaseous products of the activation step.

In all cases, the char was produced from Colorado anthracite, which is generally considered to be one of the most difficult materials to activate.

Table 2, it will be noted that the temperature of the gas entering the retort can, in a given set of circumstances, be too high—as witness run 7.

|  | Table No. 1, No Pressure Runs | | | | Table No. 2, Pressure Runs | | | | | |
| --- | --- | --- | --- | --- | --- | --- | --- | --- | --- | --- |
|  | | | | | Series No. 1 | | Series No. 2 | | | Series No. 3 |
|  | Reactants from Natural Gas Nitrogen as Diluent | | | | Components of Reaction (CO+H$_2$) Supplied as Diluents | | Reactants from Natural Gas Nitrogen as Diluent | | | Comb. Treatment Reactants from Natural Gas Components of Reaction Supplied as Diluents |
| Run No. | 1 | 2 | 3 | 4 | 5 | 6 | 7 | 8 | 9 | 10 |
| Temperature of Gas entering Retort | 1,420 | 1,460 | 1,700 | 1,780 | 1,560 | 1,700 | 1,900 | 1,380 | 1,680 | 1,730 |
| Temperature of Charge | 1,280 | 1,320 | 1,550 | 1,500 | 1,510 | 1,500 | 1,640 | 1,320 | 1,500 | 1,500 |
| Gauge Pressure | 0 | 0 | 0 | 0 | 17.0 | 26.0 | 20 | 20 | 20 | 20 |
| Flow, Cu. Ft./Hr. at 60° F. and 12.4 Lbs. Pressure | 2,440 | 3,760 | 5,600 | 5,900 | 5,876 | 6,596 | 8,000 | 5,000 | 5,880 | 6,000 |
| Velocity, Ft./Sec | 12.1 | 22.6 | 34.8 | 35.0 | 15.4 | 14.0 | 20.3 | 11.4 | 13.9 | 14.2 |
| Dust Loss on Per Cent of Material Discharged | 0 | 0 | 5.5 | 19.6 | | | | | | |
| B. t. u. Available Per Hr | 5,860 | 10,700 | 16,000 | 30,500 | 5,240 | 23,100 | 41,000 | 5,200 | 19,500 | 19,300 |
| Pounds Carbon Oxidized/Hr | 0 | .13 | 2.7 | 5.7 | 0.8 | 4.0 | 6.3 | 0.9 | 3.6 | 3.4 |
| B. t. u. Required Per Hr. Basis Carbon Oxidized | 0 | 575 | 12,300 | 26,000 | 3,580 | 18,200 | 28,350 | 4,100 | 16,400 | 15,600 |
| Thermal Efficiency | 0 | 5.4 | 77 | 85 | 68 | 79 | 69 | 79 | 34 | 81 |
| Per Cent of Carbon Oxidized | 0 | 1.1 | 23.0 | 45.0 | 26 | 51 | 31 | 50 | 60.6 | 55.0 |
| Product Density | .732 | .724 | .709 | .618 | .642 | .522 | .703 | .603 | .49 | .530 |
| Activity-Iodine Adsorption | 8.3 | 7.9 | 29.2 | 38.5 | 74.3 | 93.6 | 31.8 | 67.5 | 80.3 | 79 |

Referring to Table 1, which shows the results obtained with activating gases at atmospheric pressures, it will be observed that there is substantially no oxidation of the carbon and hence substantially no activation at charge temperatures around 1300° F. (runs 1 and 2). At charge temperatures around 1500° F. the endothermic oxidation of carbon proceeds relatively rapidly, but the quality of the product is poor, being far below the minimum iodine activity requirements, say 60 for commercial carbons and 90 for most gas adsorbent carbons. The high consumption of carbon for the low activity obtained is well illustrated in run 4 in which 45% of the carbon was oxidized without obtaining an iodine activity higher than 38.5.

A further disadvantage which flows from attempting to supply all of the heat for activation from a gas at atmospheric pressures is the high dust loss. Thus in run 4 it was necessary to raise the gas velocity to 35 feet per second in order to supply the heat required for the oxidation of 5 lbs. of carbon per hour. The high gas velocity brought about a dust loss of 19.6%.

Benefits which flow from the practice of the invention will be understood through a comparison of the results given in Table 1 and those given in Table 2. Thus in runs 5 and 6, Series No. 1, Table 2, with pressures of 17 and 26 lbs. gauge, respectively, the activity of the product was twice as great as that obtained in the "no pressure runs" of Table 1. In run 3 an iodine activity of 29 was obtained with a carbon consumption of 23%, the operation being conducted at atmospheric pressure. This is in contrast with the results of run 5, in which an iodine activity of 74% was obtained with substantially the same proportion of carbon consumption, the activation being conducted at a pressure of 17 lbs. per square inch gauge. Activation at atmospheric pressure with a carbon consumption of 45% gave an activity of only 38.5 (run 4), as contrasted with the results obtained by activation at 26 lbs. per square inch gauge, where a carbon consumption of 51% gave an iodine activity of 93.6 (run 6).

To consider the results outlined in Series 2 of Table 2, it will be noted that the temperature of the gas entering the retort can, in a given set of circumstances, be too high—as witness run 7. In this run, an iodine activity of 31.8 was obtained with a carbon consumption of 31%, the activating gas being at 20 lbs. gauge. The low activity is explained by the high temperature of the gas entering the retort—1900° F. At this temperature, the endothermic oxidation of carbon proceeds at a rapid rate, with a consumption of 6.3 lbs. of carbon per hour, but this consumption apparently results from a localized oxidation taking place largely on the surface of the particles, with a resultant product of relatively low activity and high density—.703.

Runs 8 and 9 of Series 2 were conducted under more favorable conditions. Run 8, for example, with an entering gas temperature of 1380° F. resulted in an iodine activity of 67.5 in the product, the carbon consumption being 50%.

The results of run 8 may be compared with those of run 1 or run 2, which were made under conditions similar to those prevailing during run 8, except for the pressure of the activating gas. In run 2, the heat supplied per hour was approximately twice that supplied in run 8. Nevertheless, the results in run 8, due to the pressure on the activating gas, were much superior.

In short, pressure promotes the endothermic combustion of the carbon in the activation reaction and results in the formation of a more active product. The higher the pressure the lower can be the temperature at which activation takes place.

The relationship between pressure and activating gas velocity is illustrated by a comparison of run 3, Table 1 and run 5, Series 1, Table 2, operating without superatmospheric pressure. In run 3 an input of 5600 cubic feet per hour (S. T. P.) resulted in a gas velocity through the retort of 35 feet per second. In run 5 operating at 17 lbs. pressure, 5870 cubic feet of gas (S. T. P.) were introduced into the retort per hour, but the gas velocity through the retort was only 15 cubic feet per second. In other words, in run 5, a cubic foot of gas was compressed so that it occupied less than half the space of a cubic foot of gas in run 3. Hence the number of molecules striking the surface of the carbon in unit time in run 5 was twice as great as in run 3.

Low activating gas velocity is of itself advantageous, since it reduces dust loss. Further advantage resides in the fact that at low velocity the time of contact between charge and gas is increased, the net result being that an operation conducted at 17 lbs. gauge instead of at atmospheric results in about four times as many molecular impacts within the retort. Lastly, the amount of heat which can be supplied under the same conditions of temperatures and velocity in unit time is increased with increasing pressures, so that with increasing pressure the capacity of a given operating unit is increased.

I believe that the benefits due to the presence of the products of reaction (CO and $H_2$) in the activating mixture arises from the fact that these gases are held closer to the carbon surfaces due to the increased pressure. This results in slower diffusion, with resultant decrease in the consumption of active carbon and a more uniform treatment. In other words, under the conditions prescribed by my invention, hydrogen and carbon monoxide offer mechanical protection to the surface of the carbon. A further effect of the carbon monoxide and hydrogen may be due to equilibria phenomena. The carbon monoxide and hydrogen are in equilbrium with the carbon dioxide and water vapor which are the reactants. The reversible nature of the reaction has a buffering effect and extends the duration of the reaction—a favorable circumstance that promotes penetration of reactant and more uniform activation throughout the carbon particles.

Although the carbon monoxide and hydrogen do not react with the carbon under the conditions prevailing in the activating reaction, and hence may be considered as inert, it is plain that the presence of carbon monoxide and hydrogen together with the reactants, carbon dioxide and water vapor, is beneficial. Thus the presence of carbon monoxide and hydrogen results in the production of a better quality of carbon at equivalent yields or, conversely, in higher yields for the same quality of carbon. Attention is directed to run 9, Series 2, Table 2, and run 10 of Series 3, Table 2, the results of these runs being compared with those obtained in runs 5 and 6 of Series 1, Table 2. In run 9, the activating gas consisted of 28% combined $CO_2$ and $H_2O$, the balance being nitrogen, whereas in runs 5 and 6, the activating gas consisted of 24% reactants ($Co_2$ and $H_2O$) and 76% reaction products (32% CO, 44% $H_2$). In run 9, with nitrogen as a diluent, it was necessary to consume 61% of the carbon to obtain an activity of 80, whereas in runs 5 and 6 activities of 74 and 94, respectively, were obtained with carbon consumptions of 26 and 51%. The effect of the presence of CO and hydrogen is also shown by the results of run 10 in which the treating gases consisted of 21% reactants ($CO_2$ and $H_2O$), 25% reaction products (CO and $H_2$) and 54% nitrogen. Here the presence of the carbon monoxide and the hydrogen resulted in an activity of 79 with a carbon consumption of 55%.

I have found that in a pressure range of 15 to 20 lbs. gauge, it is difficult to control the endothermic activation reaction if the temperature of the activating gas rises as high as 1900° F. as, for example, in run 7. However, if the pressure is increased, control of the operation at high temperatures becomes easier, probably due to the fact that the higher pressures reduce the rate of diffusion of the products of reaction from the carbon surface. In any case, the gas temperature can be increased above 1900° F. with satisfactory results if the gas pressure is also increased to, say, 40 pounds per square inch above atmospheric.

Although I have described the activating gas in terms of the principal reactants $CO_2$ and $H_2O$ and the products of reaction CO and $H_2$, it should be noted that the presence of oxygen, sulphur or halogens, may be desirable under some conditions and for some purposes. Both halogens and sulphur appear to be effective for the removal of adsorbed organic complexes in the char. A further advantage of the use of these substances resides in the fact that chlorine may combine with carbon monoxide to generate heat to compensate at least in part for that used in the endothermic oxidation of carbon with steam. Likewise, sulphur combines exothermically with carbon at high temperatures to form carbon disulphide.

I claim:

1. The method of producing activated carbon endothermically which comprises passing an activating gas from the class consisting of steam and carbon dioxide into intimate contact with carbon in a column of finely-divided particles of carbonaceous char confined in an activating zone, the temperature of the activating gas being sufficiently high to react with the carbon in the char and to produce, in situ, a hot gaseous reaction product inert to the carbon and in equilibrium with the hot activating gas, whereby the duration of the endothermic reaction is extended, the temperature and quantity of the activating gas being sufficient to supply by its sensible heat all the thermal requirements of the endothermic reaction, continuing the reaction between the activating gas and the carbon until the amount of inert gas is equal to at least one-half of the gaseous mixture in contact with the carbon in the activating zone, and maintaining the activating zone under a pressure of at least five pounds per square inch greater than atmospheric pressure, said pressure being sufficiently high to reduce the velocity of the gases during their passage between the particles of char in the column substantially below that which would obtain at normal pressure so that the hot densified activating and inert gases are maintained in longer heat interchanging contact with the individual char particles per unit of time and the activating efficiency of the gases is increased substantially.

2. Method according to claim 1, in which the activating gas is steam and the inert gases produced in situ are carbon monoxide and hydrogen.

3. Method according to claim 1, in which the activating gas is carbon dioxide and the inert gas produced in situ in carbon monoxide.

4. Method according to claim 1, in which the activating gases are steam and carbon dioxide and the inert gases produced in situ are carbon monoxide and hydrogen.

KENNETH BARTON STUART.

REFERENCES CITED

The following references are of record in the file of this patent:

UNITED STATES PATENTS

| Number | Name | Date |
|---|---|---|
| 1,641,053 | Sauer | Aug. 30, 1927 |
| 1,893,363 | Godel | Jan. 3, 1933 |
| 1,903,834 | Oberle | Apr. 18, 1933 |
| 2,162,763 | Stuart | June 20, 1939 |
| 2,201,050 | Oberle | May 4, 1940 |
| 2,257,907 | Griswald | Oct. 7, 1941 |

Certificate of Correction

March 28, 1950

Patent No. 2,501,700

KENNETH BARTON STUART

It is hereby certified that error appears in the printed specification of the above numbered patent requiring correction as follows:

Column 8, line 57, for the words "in carbon" read *is carbon*; and that the said Letters Patent should be read with this correction therein that the same may conform to the record of the case in the Patent Office.

Signed and sealed this 27th day of June, A. D. 1950.

[SEAL]

THOMAS F. MURPHY,
*Assistant Commissioner of Patents.*